Dec. 25, 1951  E. C. THOMSON  2,579,883
FLAME FAILURE CONTROL SYSTEM
Filed June 13, 1947  3 Sheets-Sheet 1

Inventor
E. Craig Thomson
By M C Metcalf
Agent

Dec. 25, 1951     E. C. THOMSON     2,579,883
FLAME FAILURE CONTROL SYSTEM
Filed June 13, 1947     3 Sheets—Sheet 2

Inventor
E. CRAIG THOMSON

By M C Metcalf
Agent

Inventor
E. Craig Thomson
By M C Metcalf
Agent

Patented Dec. 25, 1951

2,579,883

UNITED STATES PATENT OFFICE 2,579,883

FLAME FAILURE CONTROL SYSTEM

E. Craig Thomson, Boston, Mass., assignor to Combustion Control Corporation, Cambridge, Mass., a corporation of Massachusetts Application June 13, 1947, Serial No. 754,435

16 Claims. (Cl. 158—28)

This invention relates generally to the control of heating systems, and particularly to the flame failure controls for furnaces of the industrial type which burn vaporized or pulverized fuel.

Many serious explosions, resulting in considerable damage and loss of life, have occurred in furnaces because of continued admission of fuel after the flame has become extinguished. Furnaces of the industrial type are particularly hazardous because of the large volume of fuel handled and the high operating pressures and temperatures. A number of devices, known in the burner industry as "flame failure" or "flame monitoring" controls, have been developed for detecting the absence of flame and shutting down the fuel supply. On many types of furnaces, particularly on the hand-ignited types, such controls are used to monitor the main flame. On certain types of automatically operated furnaces, employing a pilot flame to ignite a main flame, a control for monitoring the pilot flame may be required in addition to a control for monitoring the main flame so as to prevent admission of fuel if the pilot flame fails to become ignited during the starting period. Because of the important function of such a control, the highest degree of "safe failure," that is, alarm response to improper operating conditions other than flame failure, is desirable. In the ideal control, failure of any of the monitoring functions due to failure of any component of the control itself or for other reasons should cause the same alarm response as a flame failure so that the furnace cannot continue in operation with an inoperative control. Furthermore, because of the expense often attendant upon shutting down a large industrial heating plant, such controls should require a minimum of adjustment and maintenance.

Many types of controls have heretofore been used for this purpose, the most common being the thermostatically operated stack switch, the flame rod and the photocell types. While these controls all have provided a certain degree of protection, it has been found that under certain conditions each type has its disadvantages. For example, the stack switch, being dependent on change in temperature in the flue for its operation, may fail to act for an appreciable length of time after the flame goes out because of the heat radiated by the furnace walls and because of its inherent lag. Where the rate of fuel consumption is high, it has been found that a stack switch cannot be depended on to act quickly enough to prevent explosions. A stack switch is obviously unsuitable for monitoring the pilot flame which does not provide any substantial amount of heat. The flame rod type, consisting generally of a control circuit including an electrode which makes contact with the flame itself so as to establish an electrical circuit whose current flow may be used, amplified or directly, to operate a suitable relay, is satisfactory for use on a well-adjusted gas flame in which combustion is fairly complete so that carbon does not accumulate on the rod. When used in an oil flame, however, the rod rapidly becomes covered with carbon and requires frequent cleaning and operation is generally unsatisfactory. Moreover, in the types of controls in which the circuit including flame rod is used to control an amplifier tube, certain undesirable characteristics have hitherto existed. Because of the inherent rectifying properties of flames, and the necessity for grounding the burner, the flame rod is most advantageously satisfactorily used to furnish a negative control potential to the control electrode of the tube when the flame is present. It is apparent, therefore, that in a conventional amplifying circuit the amplifier tube must be non-conductive when the flame is present and become conductive on flame failure. Any relay which is connected in the output circuit of the tube for the purpose of shutting down the burner on flame failure is therefore de-energized when the burner is in operation. In such a device when either the relay or the tube fails, the burner may continue in operation in the absence of flame. This condition is known as "unsafe failure." In such devices, also, accidental short-circuiting may similarly result in continued operation of the burner after the flame is extinguished. In order to prevent such continued operation, certain devices have been designed which take advantage of the rectifying characteristics of a flame to distinguish between the flame path and a leakage path. While a considerable increase in reliability has thus been obtained, some difficulties have been encountered because of the wide variation in the rectifying properties of flames and particularly because of the erratic fluctuations of pilot flames during the ignition period.

A common disadvantage on all types now generally used is that considerable changes in installation are required in order to shift from one type of monitoring to another. For example, if a control is installed to monitor the main flame of an automatically ignited furnace having a pilot flame and it is later found desirable to monitor the pilot flame as well, an entirely different system must be installed.

It is accordingly the general object of this invention to provide a flame failure control system which affords an unprecedented degree of explosion prevention for a wide variety of furnaces and requires a minimum of maintenance. To this end, a novel electronic circuit is employed having a single amplifying element which is rendered conductive by the application of a negative potential to one of two control grids. This negative potential may be supplied by a control circuit including a flame rod and/or a photocell. The control is designed so that either type of flame detecting element may be readily substituted for, or connected in addition to, the other without a change in the basic control circuit. In fact, the circuit is so designed that the detecting elements may be mounted in housings separate from the main control components and only a few simple connections are required to change over an installation from one type of monitoring system to another. This control system is further designed to be unaffected by a certain amount of leakage across the flame detecting elements, so that servicing and replacement of those elements is reduced to a minimum.

Another object is to provide a flame failure control which, while operating satisfactorily in the presence of a certain tolerated maximum amount of leakage across the flame detecting element, causes an alarm response when excessive leakage, open circuit or short circuit across the flame detecting element occurs.

Another object is to provide a flame failure control which operates quickly enough upon flame failure to avoid all danger of explosion.

Another object is to provide a flame failure control system in which momentary flickering or fluctuation of the flame cannot cause a false alarm response.

Another object is to provide a control device of the type employing a flame rod as the detecting element which operates satisfactorily regardless of variations in the rectifying properties of the flame, but which nevertheless uses the rectifying properties of the flame to best advantage.

Another object is to provide a control in which failure of the components which customarily require periodic replacement or servicing in a device of this type results in shutting down of the fuel supply so that the burner cannot be operated until the control has again been put into proper operating condition.

Another object is to provide a flame failure safeguard which is adapted for further control by a device responsive to a dangerously low boiler water level where the furnace is used to heat water in a boiler.

Other objects of the invention will become apparent from the description of various embodiments thereof that follows, illustrating the nature of the invention. The description refers to drawings in which.

The invention contemplates generally the provision in an electronic circuit of an electron tube having an anode and a cathode and at least three grids arranged between the anode and cathode. The anode and cathode have the usual potentials applied to them for the production of an electron stream therebetween. The anode is coupled to the first grid, that nearest the cathode, through a biasing means suitable for maintaining the grid at cut-off potential. A plate load resistor, or other suitable impedance, is provided in the anode circuit. The third grid, that nearest the anode, is used as a control grid for the entire system, and to this grid is applied the control potential, which is normally negative with respect to the cathode potential. The second and remaining grid, between the first and third grids, is used as a second anode, and in the circuit of this grid is located the relay or other operator device. A potential which is positive with relation to the cathode potential is applied to the second grid. When a sufficiently negative potential exists on the third grid, electrons are cut off from the normal anode, which assumes the highest potential possible. This in turn raises the first grid to a sufficiently high positive potential to cause electrons to flow toward the second grid. The second grid then functions as an anode and currents flow in its circuit, through the relay, maintaining the relay energized as long as the negative potential is applied to the third grid. When the third grid is raised to cathode potential or becomes positive with respect to the cathode, electrons are permitted to pass to the normal anode, and normal anode current produces a drop in the normal anode potential due to current flowing in the plate load impedance. In turn, the potential on the first grid drops, since, as has been stated, the first grid is coupled to the normal anode, and the flow of electrons from the cathode to the second grid, or second anode, is cut off. The relay is then de-energized as a result of the positive potential applied to the third grid.

The tube here illustrated is of the pentode type having an anode, cathode and three grids conventionally referred to as "control," "screen," and "suppressor." In the following description, in order to facilitate understanding by those familiar with such tubes, the first, second and third grids in the arrangement described above are referred to throughout as the control, screen, and suppressor grids, respectively, even though the suppressor, or third grid, is actually used to control the electron stream. It is evident that other types of tubes having two or more possible discharge paths emanating from a common cathode, and a control electrode, so disposed as to shift the distribution of the electron stream from one path to another on application of a control potential, might successfully be employed in this circuit.

Figure 1:
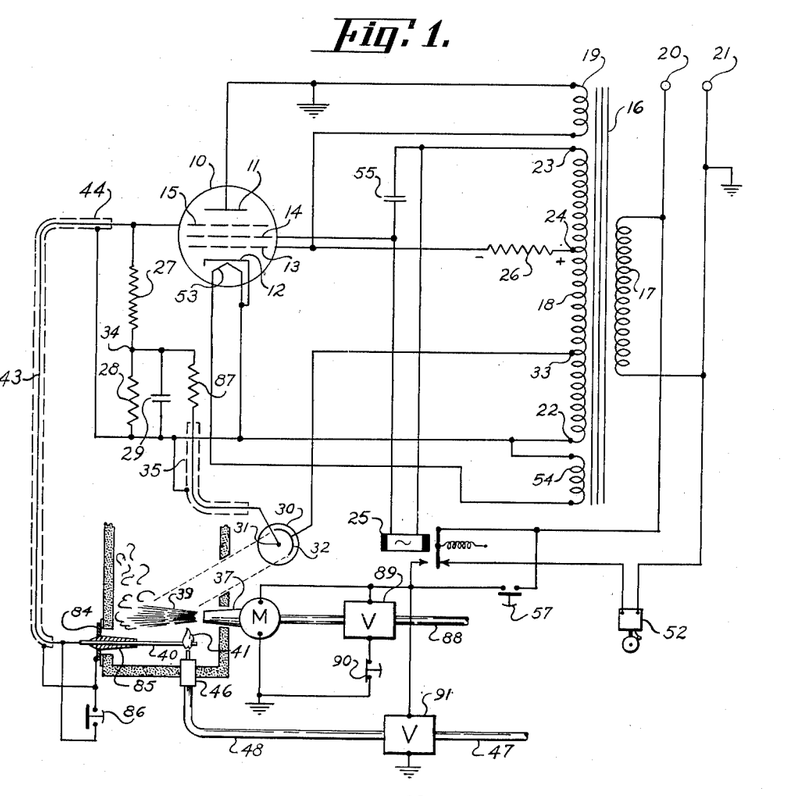
Fig. 1 illustrates in electrical scheme a flame failure control circuit in accordance with the invention, showing a photocell and a flame electrode as the detecting elements for the pilot and main flames, respectively.
Figure 2:
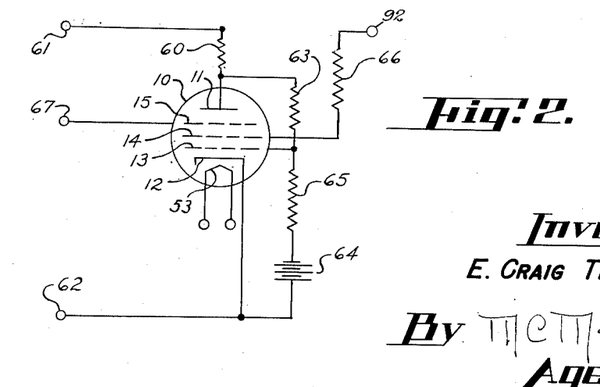
Fig. 2 illustrates the principle of the invention in simplified electrical scheme.

The operation of the basic control circuit may be most readily understood by reference to the simplified schematic drawing of Fig. 2. The circuit there illustrated is also suitable for use in a control system such as that shown in Fig. 1 in installation powered by direct current. The plate circuit of tube 10 is supplied with a direct potential from terminals 61 and 62, a positive potential being applied to the anode 11 through a plate load resistance 60 from the positive terminal 61, and a negative potential being applied to the cathode 12 directly from the negative terminal 62. The cathode heater 43 may be supplied in any conventional manner. The anode 11 is connected to control grid 13 through a first biasing resistance 63. A biasing battery 64 is connected at its positive end to the cathode 12 and at its negative end to the control grid 13 through a second biasing resistance 65. The anode 11 is thus maintained positive with relation to the control grid 13. The screen grid 14 is connected to a second positive terminal 92, at or near the potential of terminal 61, through a load resistance 66, which may, for example, be the coil of a relay as in Fig. 1. The screen grid 14 is thus connected in the manner of an anode and is positive with respect to the cathode 12. A control potential may be applied from terminal 67 to suppressor grid 15.

The circuit of Fig. 2 operates as follows:

Assuming that a positive potential, which may for example be of the order of 150 volts, is applied to the positive terminal 61 and a potential of zero volts to the negative terminal 62, and that the cathode heater 53 is suitably energized, the cathode 12 emits electrons which are attracted toward the anode 11. If terminal 67 and, therefore, suppressor grid 15 is at or above the potential of cathode 12, current will flow in the anode circuit through load resistance 60, dropping the potential of anode 11. Under these conditions a relatively small current flows through biasing resistances 63 and 65. The voltage of battery 64 is of such a magnitude that, with this relatively small flow of current through resistance 65, a substantial negative bias is maintained on control grid 13, allowing only a small current to flow through the tube. An important feature of this device is that the value of resistance 60 is considerably higher than that of resistance 66. Consequently, a small plate current will give rise to a relatively large potential across resistance 60, sufficient, for example, to insure maintenance of a substantial negative bias on control grid 13 as previously explained. A screen current of the same order of magnitude as the plate current, however, gives rise to a relatively small potential across resistance 66. Assuming, for example, that resistance 66 is the coil of a relay, when suppressor grid 15 is at or near anode potential, potential drop due to the flow of plate current through resistance 60 may be sufficient to maintain the desired negative bias on control grid 13; the potential drop due to the screen current simultaneously flowing through resistance 66, however, may be too small to operate the relay. It is further evident that the bias on grid 13 is self-stabilizing in that an increase in plate current increases the negative bias on the grid, thereby tending to reduce the plate current. If a negative potential, having a magnitude of the order of −25 to −35 volts with respect to the cathode potential, is applied to the suppressor grid 15 at the terminal 67, electrons from the cathode 12 are cut off from the anode 11, or at least sufficiently reduced in quantity so that very little current flows through the plate load resistance 60 as a result of the electron stream in the electron tube 10. Consequently, the potential at the anode 11 rises and approaches more nearly the positive potential applied at the positive potential terminal 61. The current through resistances 63 and 65 increases, decreasing the negative bias of grid 13 with respect to the cathode, or even producing a positive bias. The decreased negative bias of grid 13 allows an increased electron flow from the cathode 12 towards the screen grid 14, which, as stated above, is connected to the power source in the manner of an anode. Thus, although very few, if any, electrons arrive at the anode 11, because of the aforementioned negative potential on the suppressor grid 15, a substantial stream now flows in the tube 10 from the cathode 12 to the screen grid 14 as an anode, and sufficient current flows in resistance 66 to energize an operating device, for example, a relay.

A suitable set of values for the various resistances and the battery in the circuit of Fig. 2 is as follows:

Plate load resistance 60______ 0.5 megohms (M)
First biasing resistance 63____ 5.0 megohms (M)
Second biasing resistance 65___ 3.0 megohms (M)
Load resistance 66___________ 0.25 kilohms (K)
Battery 64__________________ 30 volts A type 6AB7 pentode tube may be used in the circuit of Fig. 2, although other types of electron tubes are satisfactory. The circuit element values given in the table above and elsewhere herein are exemplary only. Obviously their magnitudes may be varied to satisfy particular operational requirements.

Referring now to Fig. 1, an electron tube 10, which, as previously explained, may be a tube of the 6SK7 or other suitable variety, has an anode 11, cathode 12, and control, screen and suppressor grids 13, 14, and 15, respectively. The electron tube 10 is energized by a transformer 16 having a primary winding 17, and first and second secondary windings 18 and 19, respectively, of which the first, 18, provides high voltage. The primary winding 17 is connected to a source of alternating current, applied at suitable input terminals 20 and 21, which may be, for example, of 115 volts or 230 volts. One end 22 of the first secondary winding 18 is connected to the cathode 12, while the other end 23 of that secondary winding is connected to the screen grid 14 through relay 25, and condenser 55. The screen grid 14 is used as an anode, as explained with reference to the operation of Fig. 2. The control grid 13 is connected to the normal anode 11 through the second secondary winding 19 which during every other half cycle provides a source of potential equivalent to the voltage drop across resistance 63 of Fig. 2 to maintain the anode 11 positive with respect to the control grid 13 when the screen grid 14 is positive with respect to the cathode 12. The anode 11 and control grid 13 are connected to the cathode through load resistance 26 and tap 24 of secondary winding 18. When plate current is flowing the potential drop across resistance 26 performs the previously explained function of battery 64 in Fig. 2, overcoming the positive bias of secondary 18, and maintains grid 13 sufficiently negative to cut off electron flow to screen 14. Resistance 26 also performs the current limiting function of resistance 60 in the plate circuit. The suppressor grid 15, nearest the normal anode 11, is connected through a resistance network comprising a first resistance 27 and a second much higher resistance 28 in series, to the cathode 12. A capacitor 29 is connected in parallel with the second relatively large resistance 28. A photoelectric cell 30, having an anode 31 and a cathode 32, is connected at its cathode to a point 33 on the first secondary winding 18 between the cathode connection point 22 and the control grid connection point 24. The anode 31 is connected to the junction point 34 of resistances 27 and 28 and the capacitor 29. This connection provides a potential at the junction point 34 which is negative with respect to the cathode potential when the photocell 30 is illuminated, as will be explained below. If the photocell 30 is mounted remotely from the remainder of the circuit, a shield 35 may be employed around the photocell anode lead, and is connected to the cathode 12 of tube 10.

A control potential is additionally applied to the suppressor grid 15 by means of a flame electrode 40 in contact with a flame 41, which may be a gas pilot flame, and connected to the suppressor grid 15 by means of a shielded cable 43, the shield 44 of which is connected to the cathode 12. The flame electrode illustrated in partial cross-section in Fig. 1 is preferably of a type generally used consisting of a conductive rod mounted in an insulating bushing 85. The bushing is held in a conductive metal plate 84 which is mounted on but insulated from the furnace wall. In this type of electrode, the guard plate serves to divide the surface leakage into two paths, thus reducing leakage due to soot accumulation, since the potential difference across either path is considerably less than the potential difference between the rod and ground. The guard plate is here connected to the cable shield 44 and thence to the junction point of resistance 28 and cathode 12 for purposes to be later described herein. The pilot flame 41 may be furnished by a gas burner 46, which is normally grounded, by connection with the furnace wall. The fuel supply to the gas flame 41 is controlled by a valve 91, illustrated diagrammatically as a block, and is brought to the gas burner 46 through pipes 47 and 48 from a supply source (not shown).

The valve 91 is electrically operated, for example, by means of a solenoid (not shown) energized from the main power line which supplies terminals 20 and 21. The armature 50 of relay 25 controls the power to the valve 91. When the relay 25 is energized, the armature 50 closes the circuit to the valve 91, holding the valve open and permitting gas to pass to the flame 41. When the relay 25 becomes de-energized, the armature 50 changes position, opening the circuit of the valve 91, permitting the valve to close and cut off the gas supply to the flame 41, and simultaneously closing the circuit of an alarm 52.

The oil burner 37 is driven by an electric motor M, and supplied with fuel through pipe 88. The fuel supply is controlled by a second solenoid valve 89. The motor and valve circuits are also controlled by the armature of relay 25.

A normally open holding switch 57 is connected in parallel with the control switch 50, and may be temporarily held closed during starting. In an automatically operated furnace, this switch 57 would be one of the contacts of an automatic timing or cycling mechanism. A second switch 90 is indicated for holding the oil valve closed for any desired delay period after the starting of the pilot and burner motor. This switch would ordinarily be a contact on an automatic timer. The timing and switching arrangements for starting the burner are not shown or described in detail herein, being well-known in the art and subject to wide variation.

A cover switch 86 may be connected between the guard plate and the flame rod lead. This switch when used is normally held open by the cover of the container (not shown) housing the flame rod, and closes when the cover is removed.

The heater element 53 of the electron tube 10 is energized in a conventional manner by an auxiliary secondary winding 54 on the transformer 16 provided for that purpose. A capacitor 55 is connected in parallel with the relay 25 for the purpose of maintaining that relay energized during the half cycle when the electron tube 10 is non-conductive.

The apparatus of Fig. 1 operates as follows:

Positive potential is applied to the screen grid 14 as an anode through the relay 25 and capacitor 55 by the first secondary winding 18 of the transformer 16 during the half cycle when the upper end terminal 23 thereto connected is positive. At that time, the potential applied to the cathode 12 is negative. Simultaneously, a somewhat less positive potential is applied to the control grid 13 and anode 11 by the same secondary winding through load resistance 26. The secondary winding 19 provides a biasing potential between the anode 11 and control grid 13 which simultaneously renders the anode 11 more positive than the grid 13.

When suppressor grid 15 is at cathode potential or positive with respect to the cathode, electrons flow to the anode 11, thence through the second secondary winding 19, the load resistance 26, and the part of the first secondary winding 18 between the connecting points 24 and 22 to the cathode 12. This electron current causes a voltage drop in the resistance 26 which overcomes the positive bias applied from tap 24 and lowers the potential of control grid 13, reducing or substantially cutting off the electron stream to the screen grid 14, thereby de-energizing the relay 25. As explained in the reference to Fig. 2, the load resistance in the plate circuit, resistance 26 of Fig. 1, is of a considerably higher value than the load resistance in the screen circuit, the coil of relay 25, so that that part of the small electron stream which flows to the anode in spite of the negative bias of grid 13 is sufficient to maintain the negative bias on grid 13 through resistance 26, but the part which flows to the screen is insufficient to energize the relay.

When a negative potential is present at the suppressor grid 15, electrons from the cathode 12 are cut off from the anode 11. As a result, substantialy no current flows in load resistance 26 and the positive potential provided to the control grid 13 by the first secondary winding 18 is sufficiently great to allow substantial electron flow to the screen grid 14 and thence through the relay 25 and secondary 18 back to the cathode 12. This screen current maintains the relay 25 energized. It is thus evident that an electron stream is maintained flowing in an electron tube by virtue of a negative potential applied to a control grid of that tube in that same electron stream. During the half cycle when the cathode 12 is positive, the relay 25 is maintained energized by the parallel connected capacitor 55. The negative control potential of suppressor grid 15 is obtained from the flame electrode 40 and 41, or the photocell 30, or both, in the manner about to be described.

It is well-known that flames are conductive and, to a certain extent, rectifying in character in that current flows more freely from the tip of the flame to the base than in the opposite direction. As previously remarked herein, many flame failure controls of the flame rod type depend upon this rectification for their operation. Since the rectifying properties vary widely according to the character of the flame, such controls are not entirely satisfactory under certain conditions, particularly when the flame is poorly adjusted or has not reached a steady state after ignition.

Since it is generally desirable to start monitoring of the flame as quickly as possible after ignition, especially when the flame is a pilot, this circuit is designed to apply a D. C. potential superimposed on an A. C. potential across the flame, from the flame rod to ground, in such a direction as to reinforce any rectifying action of the flame, but of such magnitude as ordinarily to render the control operative even when such rectifying action is negligible or erratic. The circuit of the flame rod is completed through the flame 41 to ground and through resistance 27, parallel connected capacitance 29 and resistance 28, the part of the first secondary winding 18 between the connection points 22 and 24, the load resistance 26, the second secondary winding 19, to ground. This circuit is energized by alternating current from the aforementioned part of the first secondary winding 18 and the second secondary winding 19 in series.

It has been seen that when plate current is flowing, a potential drop is developed across load resistance 26 which tends to lower the potential of grid 13. This potential drop also superimposes a rectified D. C. potential on the alternating potential supplied by secondaries 18 and 19 to the flame rod circuit. When no current flows in the plate circuit, grid 13 becomes positive with respect to the cathode, and grid current flows through resistance 26 causing a potential drop of the same polarity as that resulting from plate current. A rectified D. C. potential derived either from plate current or from grid current, therefore, is always present in the flame rod circuit during the half cycles when the tube can conduct.

When the flame rod is connected through the flame, to ground, an alternating current with a superimposed direct current flows in the flame rod circuit. The alternating current is by-passed by capacitor 29. The direct current, however, tends to charge capacitor 29, resistance 28 being relatively high in order to permit this charging to occur. The charge is in such a direction as to make suppressor grid 15 negative with respect to the cathode. On the concurrent half cycle the alternating current through resistance 27 tends to raise the potential of the suppressor grid 15, but the values of the circuit elements are so chosen that the A. C. potential drop across resistance 27, arising from current occurring within the normal range of conductivity of the flame, is insufficient to overcome the negative bias applied by the charge of capacitor 29 on suppressor grid 15. Typical values are capacitor 29, .01 mfd., resistance 28, 150 megohms, resistance 27, 2.5 megohms.

It can be seen that a negative bias is maintained on suppressor grid 15 by this arrangement regardless of the rectifying or non-rectifying character of the flame, provided that the conductivity of the flame remains within certain limits, so that a reasonable amount of flickering or improper adjustment of the pilot flame does not affect the operation of the control. The rectification of the flame reinforces the effect of the direct potential derived from resistance 26 and increase the charge on capacitor 29, increasing the negative bias on suppressor grid 15. When the flame goes out, no current flows in the flame rod circuit and the charge on capacitor 29 leaks off through resistance 28, allowing the suppressor to assume cathode potential. Under these conditions, as previously explained, current ceases to flow in the screen circuit and relay 25 drops out. Valves 89 and 91 become de-energized and close, shutting off the fuel to the pilot and burner, the circuit to motor M is interrupted, and alarm device 52 is energized. It is evident that any desired control or alarm action may be initiated on failure of the pilot flame by the operation of relay 25. Similarly, if the pilot flame fails to ignite, no charge is built up on capacitor 29 and the suppressor remains at cathode potential. Relay 25 remains de-energized and admission of fuel to the burner prevented. In order to allow the burner to ignite a push button contact 57 is shown for shunting out the flame failure control and opening the pilot valve for a desired period. On automatically operated burners this contact would be closed for a predetermined time known generally as the "ignition period" by a program relay or timing device. If the pilot flame were not established during this period, it is evident the fuel supply would be shut off when contact 57 opened.

In many burners of the full automatic type, the pilot flame is shut off by a contact on the programming device after a predetermined period and the main flame alone is left burning. If the main flame has not been ignited, relay 25 will become de-energized as previously related. Assuming, however, that the main flame 39 has been properly established, photocell 30 is illuminated. As is well-known, a photocell, when illuminated, passes a rectified current. In this circuit it may be seen that the current is in such a direction as to charge capacitor 29 during the half cycle when the tube 10 is non-conductive, that is, when the main discharge tube cathode junction point 22 is positive with relation to the photocell cathode junction point 33, in the same direction as the capacitor was previously charged by the flame rod circuit, thereby maintaining the negative bias on suppressor 15. As long as the photocell is illuminated, therefore, current will flow in the screen circuit, energizing relay 25, even after the pilot flame is extinguished.

Upon failure of the flame 39, current through the photocell falls to too small an amount to maintain the charge on the capacitor 29, and the charge leaks off through the large resistance 28, and the suppressor grid 15 assumes cathode potential. Relay 25 becomes de-energized, and the safety control or alarm action is initiated. Since a certain time interval is required for the charge on capacitor 29 to leak off, it is evident that by suitable choice of the circuit elements any desired time delay between failure of the flame and opening of relay 25 may be introduced. Some delay, ordinarily about 4 seconds, is desirable in order to prevent false alarm responses due to flickering.

Figure 3:
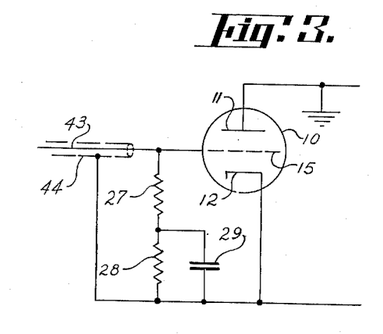
Fig. 3 illustrates schematically connections that may be used when flame electrode control alone is desired.

While the invention as illustrated in Fig. 1 makes provision for two sources of control potential operating either separately or concurrently, the invention may be employed with either type of control alone. For example, in the modification illustrated in Fig. 3, the flame electrode 40 alone furnishes the negative controlling potential. In Fig. 3, the photocell 30 and its connections are omitted and only the end of the flame rod and cable are shown. When the flame rod is connected through the flame to ground, a negative bias is applied to suppressor grid 15 as previously explained. The remainder of the circuit, where not shown, is the same as in Fig. 1.

Figure 4:
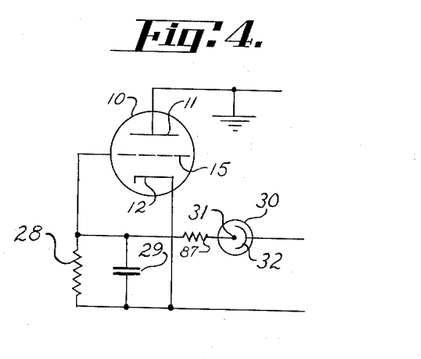
Fig. 4 illustrates connections that may be used when photocell control alone is desired.

In Fig. 4, the photocell 30 alone is used to supply the negative controlling potential to the third grid 15, the flame electrode and its connections being omitted. A current limiting resistance 87 is preferably connected in series with the photocell to avoid the danger of ionization by reverse potential if the photocell is of the gas type, and to prevent sudden surges of current which might cause rapid deterioration of the photocell cathode. As shown, the first resistance 27 of the resistance network may be omitted when the photocell alone is used. The resistance 27 may be included in the control, however, as it has no effect on the operation of the photocell circuit. The users of the device may therefore be furnished with a standard basic control circuit which is adapted for use with a photocell, a flame rod, or both, and in which flame detecting elements may be substituted or added by simple connection and disconnection of leads. This ready interchangeability of detecting systems is one of the many outstanding advantages of this device over those hitherto in use.

Figure 5:
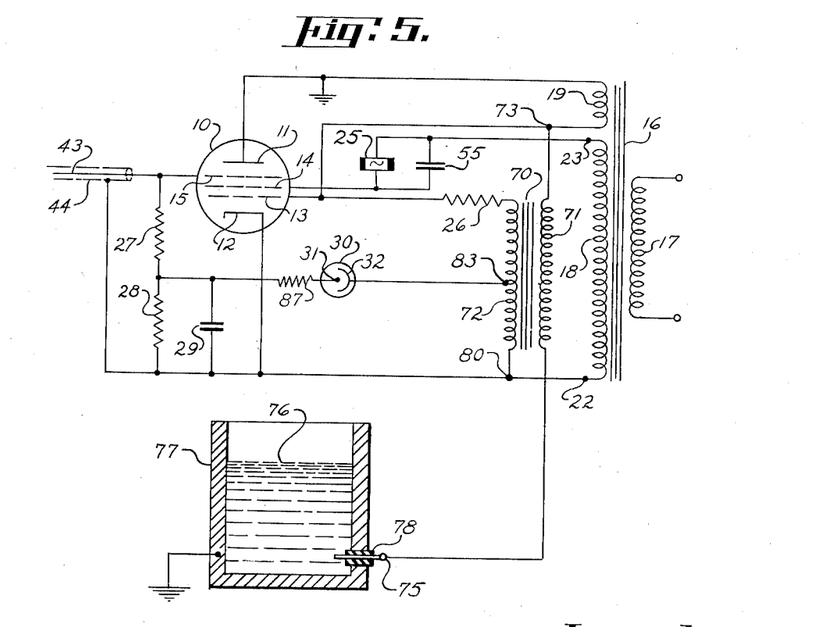
Fig. 5 illustrates the invention as modified to include a low water cut-off control in addition to the other controls, when the burner is used to heat water in a boiler.

In Fig. 5, there is illustrated a modification of the invention with provision for an additional safety control, responsive to a dangerously low water level in the boiler 77 which is heated by the main flame of a burner flame. Here the secondary winding 18 has only the end terminals 22 and 23, the intermediate terminals being omitted. An additional transformer 70, having a primary winding 71 and a secondary winding 72, is connected at one end 73 of the primary winding to the junction point of the control grid 13 and the circuit of the anode 11. The other end of the primary winding 71 is connected to a probe electrode 75 which is immersed in water 76 contained in the boiler 77, which is being heated by the flame 39 (not shown). The probe 75 may be inserted through a side of the boiler 77, being secured in place by a suitable insulating bushing 78, at the level below which the water should not fall for safe operation. The boiler 77 is grounded. The secondary winding 72 of the additional transformer 70 is connected at one end 80 to the cathode 12 of the electron tube 10, and at the other end to the control grid 13 through the plate load resistance 26. The cathode 32 of the photocell 30 is connected to the secondary winding 72 of the additional transformer 70 at an intermediate point 83, which takes the place of the corresponding junction point 33 of the secondary winding 18 in Fig. 1. The remaining parts of the circuit of Fig. 5 are the same as the correspondingly numbered parts of the circuit of Fig. 1. The anode lead shield 35 for the photocell 30 has been omitted, but may be included if desired.

The device illustrated in Fig. 5 operates as follows:

The additional transformer 70 is energized at its primary winding by the second secondary winding 19 of the first transformer 16, the energizing circuit being completed through the probes 75, water 76, boiler 77, and the ground. When the primary winding 71 is energized, the secondary winding 72 provides operating potentials for the control grid 13 and anode 11 of the electron tube 10 and the circuits of the photocell 30 and the flame rod 40 equivalent to those provided by the secondary winding 18 in the apparatus of Fig. 1, and the apparatus of Fig. 5 operates in the same manner as the apparatus of Fig. 1. However, if the water level falls below the height defined by the probe 75, the circuit of the primary winding 71 is opened, and the photocell and flame rod circuits are substantially de-energized. The negative charge on condenser 29 leaks off and the second secondary winding 19 supplies sufficient potential to cause electrons to flow to the anode 11, and through the plate load resistance 26 and secondary winding 72 back to the cathode 12. The potential of the control grid 13 is lowered with relation to the cathode potential both by the drop in the plate load resistance 26 and the loss of voltage in the secondary winding 72. The control grid 13 then cuts off electron flow to the screen grid 14. The relay is de-energized, initiating appropriate safety action as already described in the reference to Fig. 1.

An outstanding advantage of this apparatus over other devices used for the same purpose is its greatly increased reliability. Many devices of this type "fail safe," that is, give an alarm response when certain types of component failure occur, but in this device the range of component breakdowns or defects which result in shutting down of the burner has been greatly widened. While the occurrence of an unforeseen and highly unlikely type of damage or defect is always a possibility in any operating system, this control has been so designed that the normal component failures most likely to occur in severe industrial usage will result in an alarm response. A considerable degree of deterioration in the flame detecting elements is nevertheless tolerated so as to reduce maintenance to a minimum. It is readily apparent, for example, that failure of the single amplifier tube, which is customarily a replaceable type of component in electronic controls, will cause relay 25 to drop out, shutting down the burner as if flame failure had occurred. Other parts of such a control likely to give trouble are the detecting elements and their leads. This is especially the case when these elements are located at some distance from the remainder of the circuit, as is either necessary or convenient in many installations. The most frequent causes of improper operation in the flame rod circuit are: short circuiting of the flame rod to ground by accidental contact with some part of the burner, short circuit, or substantial reduction of the resistance between the flame rod and guard plate, due to excessive accumulation of soot, failure of the rod to conduct adequately due to excessive accumulation of soot, disconnection of the flame rod cable, short circuit between the flame rod lead and shield, and short circuit of shield to ground. In the photocell circuit, corresponding causes of improper operation are: short circuit between photocell cable and shield, short circuit from shield to ground, short circuit or excessive leakage across the photocell base or socket, failure of the photocell in the normal way, by disintegration of the cathode coating, and excessive leakage across the interior of the photocell due to deposit of caesium on the internal insulating surfaces. The latter type of leakage is particularly common in photoelectric flame detection devices, as the high ambient temperature to which the photocell is exposed accelerates the evaporation of caesium from the cathode. The operation of the apparatus under the various short circuit and leakage conditions enumerated above can be more readily understood by reference to Fig. 6.

Figure 6:
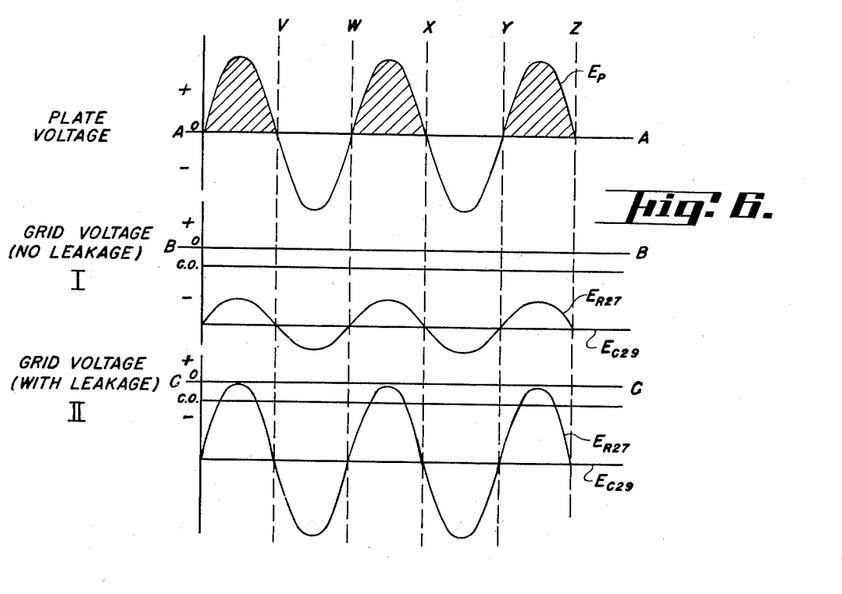
Fig. 6 is a graph showing the time relationship existing between the plate or anode potential of the single electrode tube of the invention and the potentials on the control grid under various conditions of operation.

The voltage furnished by the transformer winding 18 to the grid 13 and anode 11 is shown as a "plate voltage" sine wave along line A—A, the positive half cycles being shaded. Vertical dashed lines V—V, W—W, Y—Y and Z—Z mark off successive half cycles of this sine wave.

The two grid voltage waves illustrated in graphs I and II below the plate voltage wave explain the function of the resistance 27 in the flame rod circuit. In graph I, the line B—B represents the zero voltage level. The "no leakage" wave, just under line B—B, illustrates a condition in which there is sufficient negative potential at the suppressor grid 15 to keep electrons substantially cut off from the anode 11. The cut-off level is represented by a line marked "C. O." at a negative voltage level below line B—B. The negative charge furnished to the capacitor 29 by the flame rod and/or photocell circuits is represented by a second line marked $E_{c29}$, at a below cut-off voltage level. A sinusoidal wave, $E_{R27}$, superimposed on the capacitor voltage wave $E_{c29}$, represent the algebraic sum of the alternating voltage present across resistance 27 due to alternating current flowing in the flame rod circuit and the normally constant potential of capacitor 29. As previously explained, the rectification characteristics of the flame may vary with the nature of the flame and there is always some alternating current flowing in the flame rod circuit. When the flame rod is in proper operating condition, however, and only negligible leakage takes place across the insulation, the alternating voltage across resistance 27 is too small to raise the potential of suppressor 15 above cut-off at any point in the cycle. The alternating current voltage across resistance 27 is substantially in phase with the plate voltage.

In graph II, the line C—C represents the zero voltage level. A short circuit or substantial reduction in impedance between the flame rod 40 and ground causes the amplitude of $E_{R27}$ to be increased until, on the positive half cycles, the grid voltage is above the cut-off value (line C. O. just below line C—C) even though the normal operating charge may be simultaneously maintained on capacitor 29 by the photocell circuit. Under this condition, electrons flow to the anode 11 and the relay 25 is de-energized, initiating the same control and alarm actions as would normally result from flame failure.

A short circuit, or substantial decrease in impedance between the flame rod and guard ring or between the flame rod lead and shield, tends to discharge capacitor 29, bringing suppressor 15 to cathode potential, thereby allowing electrons to flow to the anode instead of to the screen 14, and again relay 25 is de-energized. As mentioned before, in order to prevent the possibility of a false operation when the cover of the flame rod housing is removed, for example by accidental connection of the flame rod to ground through a resistance of magnitude comparable to the flame resistance, a cover switch is provided. This switch 86, when the cover of the flame rod housing is removed, short circuits the flame rod to the guard plate, shutting down the burner in the manner just described. This particular arrangement has the advantage of shutting down the burner without shutting off the heater of the tube 10, so that the control device is ready for immediate operation when the cover is replaced.

A short circuit of the shield, or guard plate to ground, brings the cathode to ground potential. The bias supplied by secondary 19 under this condition makes control grid 13 negative with respect to the cathode, cutting off current through the screen circuit.

A short circuit, or substantial leakage across the photocell, provides a discharge path for capacitor 29, and the potential of suppressor 15 rises above cut-off as shown in graph II of Fig. 6, even though the flame rod circuit may be functioning properly.

A short circuit of the photocell lead to ground similarly provides a discharge path for capacitor 29, and current ceases to flow in the screen circuit.

A short circuit from the photocell shield to ground brings the cathode to ground potential. The bias supplied by secondary 19, under these conditions, cuts off the screen circuit.

The parallel resistance 28 is of the order of 150 megohms, so that a resistance value in the photocell circuit that is below this value would have the characteristic of a short circuit. When the flame rod circuit is not used, as shown in Fig. 4, resistance 27 may be included or not, as mentioned above, for without the flame rod circuit it will have no effect, but its inclusion will provide a universally adaptable control device.

Likewise, the capacity introduced in shunt with either detecting element by the leads when the flame rod, or photocell, or both, are located remote from the remainder of the circuit is in the nature of an A. C. leakage path and has the same effect, described above, as a resistance leakage path. For practical cable lengths, this capacitance is normally so small as to have a negligible effect on the operation of the control. If leakage due to this capacitance should become dangerously great, the only kind of failure that can occur is "safe failure," that is, current through the screen circuit will be cut off and relay 25 will drop out.

It is evident that disconnection of the flame rod cable or substantial loss of conductivity of the flame rod will have the same effect as failure or absence of the pilot flame. It is also apparent that disconnection of the photocell cable or failure of the photocell will have the same effect as failure or absence of the main flame. In either case, the negative charge $E_{c29}$ on the capacitor 29 leaks off through the parallel connected resistance 28. The $E_{R26}$ rises above cut-off during the positive half cycles (line E—E) and the relay 25 is de-energized. As previously indicated, due to the relatively large size of the shunt resistance 28 around the capacitor 29, fluctuations of the flame, or momentary flickering, do not cause the tube 10 to be cut-off simultaneously, but rather, a time delay is introduced, so that the control shuts down the burner only when the flame has actually failed. This time delay depends on the time required for the capacitor 29 to discharge, through the resistance 28, to a value which allows voltage $E_{R26}$ to rise above cut-off during positive half cycles. The charge on capacitor 29 is dependent on the current through the flame detecting element. In the combined photoelectric and flame rod control, limiting resistance 86 serves the further purpose of permitting the current through the photocell, and consequently the time delay when the photocell circuit is in control, to be adjusted independently of the time delay associated with the operation of the flame rod circuit.

When the flame rod circuit is used, another practical advantage provided by the small time delay is that the rod need not necessarily be in continuous contact with the flame. The rod may therefore be adjusted so as to contact the edge of the flame rather than the hottest part. The life of the rod is thereby considerably prolonged.

Figure 7:
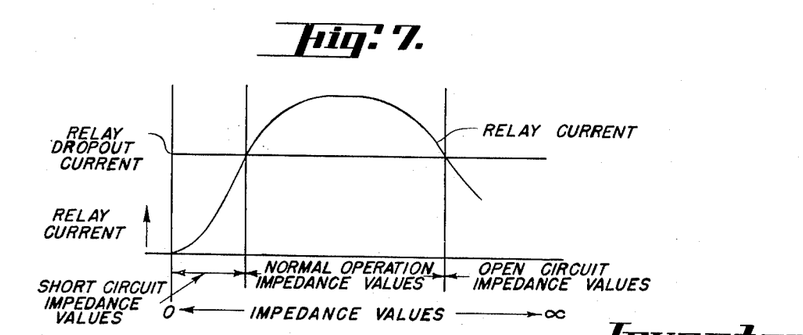
Fig. 7 is a graph showing the operating characteristics of the invention.

The qualitative graph of Fig. 7 illustrates the operating characteristics of the invention. The resistance values of the detecting circuit are represented horizontally, while the current through the relay 26 is represented vertically. As explained above, the relay current drops below the hold-in value if the detecting circuit becomes short circuited (as by alternating current leakage path around it having less than a predetermined impedance value), or open circuited (as by flame or circuit failure). Between these two extremes, there is a considerable range of "normal operation resistance values" for which the current through the relay 25 is great enough to maintain the relay sufficiently energized to hold in the switch 60. This graph clearly illustrates the following outstanding advantages of the apparatus: safe failure under an unprecedented number of contingencies, resulting in a high degree of reliability; tolerance of a considerable range of departure from ideal conditions, so that a minimum of servicing and attention is required; and satisfactory operation with the flame detecting elements remotely located to meet various spatial and practical requirements.

Since certain changes may be made in the above-described article and different embodiments of the invention could be made without departing from the scope thereof, it is intended that all matter contained in the above description or shown in the accompanying drawing shall be interpreted as illustrative only and not in a limiting sense.

What is claimed:

1. A burner control comprising: an electron discharge device having a cathode, a first and a second anode, the first anode spaced farther than the second from said cathode; a first control electrode disposed between said cathode and said second anode, and a second control electrode disposed between said anodes; a first anode circuit including voltage supply means connected between said cathode and said first anode; a second anode circuit including said cathode, said second anode, a second voltage supply means, and electrically energizable operator means adapted, when energized, to permit operation of the burner; a circuit for applying a negative bias to said first control grid, thereby reducing the current through the second anode circuit and de-energizing said operator means; and a control circuit, including a flame detecting device adapted in the presence of flame to apply a negative bias to said second control electrode thereby reducing current through said first anode and increasing the current through said second anode so as to maintain said operator means energized.

2. Apparatus according to claim 1 wherein said control circuit includes a parallel connected resistance and capacitance.

3. Apparatus according to claim 1 wherein said flame detecting device comprises a photocell.

4. Apparatus according to claim 3 wherein current through said photocell charges a capacitance connected, in parallel with a resistance, to said first control electrode.

5. Apparatus according to claim 1 wherein said control circuit is energized by the secondary of a transformer, the primary of which is energized by a second control circuit including a condition responsive device.

6. A safety control for a burner having a pilot and a main flame comprising: an electron discharge device having a cathode, a first and a second anode, the first spaced farther than the second from said cathode, a first control electrode disposed between said cathode and said second anode, and a second control electrode disposed between said anodes; a first anode circuit including voltage supply means connected between said cathode and said first anode; a second anode circuit including said cathode, said second anode, a second voltage supply means and electrically energizable operator means; means energized by current through said first anode circuit for applying a negative bias to said first control electrode, thereby reducing the current through said second anode circuit and de-energizing said operator means; and, connected to said second control electrode, a control circuit including a conductive rod adapted to be so disposed as to contact said pilot flame and a photocell adapted to be so disposed as to be illuminated by said main flame, and adapted, when either flame is burning, to apply a negative bias to said second control electrode thereby reducing current through said first anode and increasing the current through said second anode so as to maintain said operator means energized.

7. Apparatus according to claim 6 wherein said control circuit includes a resistance and a capacitance, connected in parallel between said cathode and said second control electrode.

8. Apparatus according to claim 6 wherein said supply means supplies alternating voltage and said control circuit includes a source of direct current connected in series with said rod.

9. In combination with an electrically controlled fuel burner, a safety control comprising: an electron discharge device having a cathode, a first and a second anode, the first spaced farther than the second from said cathode, and a control electrode disposed between said anodes; means responsive to flame produced by said burner; an input circuit, including said flame responsive means and said electrode, adapted to apply a negative bias to said electrode, thereby shutting off current flow to said first anode and increasing current flow to said second anode, when said flame is produced; voltage supply means connected between said cathode and said first anode; voltage supply means and an electrically energizable operator means connected between said cathode and said second anode, said operator means being arranged to control the operation of said burner.

10. Apparatus according to claim 9 having a second control electrode disposed between said second anode and said cathode, and means adapted in the absence of said flame to apply a negative bias to said second electrode.

11. A burner control comprising: an electron discharge device having a cathode, a first and a second anode, the first anode being spaced farther than the second from said cathode, a first control electrode disposed between said cathode and said second anode, and a second control electrode disposed between said anodes; a transformer having a primary winding and several secondary windings; means for supplying alternating current to said primary winding; a first anode circuit including in series connection said first anode, a first of said secondaries, a resistance, and said cathode, said first control electrode being connected to the junction point between said first secondary winding and said resistance; a second anode circuit including a second of said secondaries, and electrically energizable operator means for controlling operation of said burner, connected in series between said second anode and said cathode; and means responsive to a varying condition of said burner for applying a varying bias to said second control electrode and thereby varying the distribution of current through said anodes.

12. A burner control comprising: an electron discharge device having a cathode, a first and a second anode, the first anode being spaced farther than the second from said cathode, a first control electrode disposed between said cathode and said second anode, and a second control electrode disposed between said anodes; a plurality of sources of direct current; a first anode circuit including a load resistance and one of said sources connected in series between said cathode and said second anode; a voltage dividing network comprising two resistances and a source of steady direct potential, connected between said first anode and said cathode, said first control electrode being connected to the junction between said voltage divider resistances; a second anode circuit including a second of said sources and electrically energizable operator means for controlling operation of said burner, connected in series between said second anode and said cathode; and means responsive to a varying condition of said burner for applying a varying bias to said second control electrode and thereby varying the distribution of current through said anodes.

13. A burner control comprising: an electron discharge device having a cathode, a first and a second anode, the first anode spaced farther than the second from said cathode, a first control electrode disposed between said cathode and said second anode, and a second control electrode disposed between said anodes; a first anode circuit including voltage supply means connected between said cathode and said first anode; a second anode circuit including said cathode, said second anode, a second voltage supply means, and electrically energizable operator means adapted, when energized, to permit operation of the burner; a circuit for applying a negative bias to said first control grid, thereby reducing the current through the second anode circuit and de-energizing said operator means; and a control circuit, including a flame detecting device comprising a conductive rod adapted in the presence of flame to apply a negative bias to said second control electrode thereby reducing current through said first anode and increasing the current through said second anode so as to maintain said operator means energized.

14. Apparatus according to claim 13 wherein said rod is connected to said cathode through a capacitance in parallel with a relatively high resistance and in series with a relatively low resistance.

15. Apparatus according to claim 13 wherein said rod is circumscribed by, but insulated from, a conductive path and said path is connected to said cathode; and a normally open switch connection is provided between said rod and said path.

16. Apparatus according to claim 13 wherein said voltage supply means are alternating, and said control circuit includes a source of direct current.

E. CRAIG THOMSON.

REFERENCES CITED

The following references are of record in the file of this patent:

UNITED STATES PATENTS

| Number | Name | Date |
| --- | --- | --- |
| 1,756,893 | Warner | Apr. 29, 1930 |
| 2,060,095 | Mathes | Nov. 10, 1936 |
| 2,226,561 | Herold | Dec. 31, 1940 |
| 2,260,977 | Jones | Oct. 28, 1941 |
| 2,282,551 | Yates | May 12, 1942 |
| 2,327,690 | Ackerman | Aug. 24, 1943 |
| 2,416,781 | Thomson | Mar. 4, 1947 |